United States Patent
Walmsley et al.

(10) Patent No.: US 11,216,237 B2
(45) Date of Patent: Jan. 4, 2022

(54) INTERACTIVE DISPLAY SYNCHRONISATION

(71) Applicant: Grypp Corp Limited, Northampton (GB)

(72) Inventors: David Michael Walmsley, Newport (GB); Rama Satish Babu Kantamani, Northampton (GB); Piotr Kaczmarksi, Northampton (GB)

(73) Assignee: Grypp Corp Limited, Northampton (GB)

( * ) Notice: Subject to any disclaimer, the term of this patent is extended or adjusted under 35 U.S.C. 154(b) by 104 days.

(21) Appl. No.: 16/304,721

(22) PCT Filed: May 26, 2017

(86) PCT No.: PCT/GB2017/051512
§ 371 (c)(1),
(2) Date: Nov. 27, 2018

(87) PCT Pub. No.: WO2017/203283
PCT Pub. Date: Nov. 30, 2017

(65) Prior Publication Data
US 2019/0212968 A1    Jul. 11, 2019

(30) Foreign Application Priority Data
May 27, 2016   (GB) .................................... 1609440

(51) Int. Cl.
*G06F 3/14*    (2006.01)
*H04L 12/18*   (2006.01)
(Continued)

(52) U.S. Cl.
CPC ........ *G06F 3/1462* (2013.01); *H04L 12/1822* (2013.01); *H04L 65/403* (2013.01); *H04L 65/601* (2013.01); *H04N 7/15* (2013.01)

(58) Field of Classification Search
CPC . G06F 3/1462; G06F 3/1454; H04L 12/1822; H04L 65/403; H04L 65/601; H04L 12/1827; H04N 7/15
(Continued)

(56) References Cited

U.S. PATENT DOCUMENTS

| | | | | |
|---|---|---|---|---|
| 8,725,838 B2* | 5/2014 | Bezos | ...................... | H04L 67/06 709/218 |
| 2005/0278423 A1* | 12/2005 | White | ................... | H04L 67/104 709/204 |
| 2006/0167997 A1 | 7/2006 | Forstadius | | |
| 2007/0226312 A1* | 9/2007 | Stirbu | ...................... | H04L 63/08 709/217 |

(Continued)

OTHER PUBLICATIONS

Jul. 19, 2017—PCT/GB2017/051512—ISR & WO.
Jan. 23, 2017—GB1609440.1—Search Report.

*Primary Examiner* — Madhu Woolcock
(74) *Attorney, Agent, or Firm* — Banner & Witcoff, Ltd.

(57) ABSTRACT

A system (100) provides synchronised content between participants (20, 30) in a presentation (e.g. conference call) using a presenter component without the need to download and install additional software or plug-ins. A method for synchronising content between two or more digital content Tenderers (40) comprises: Receiving over a first communication channel a first communication indicating a change in content rendered on a first digital content renderer. Transmitting over the first communication channel to a second digital content renderer, a second communication indicating the change in content rendered on the first digital content renderer. Receiving over a second communication channel a request from the second digital content renderer for the changed content. Transmitting over the second communication channel to the second digital content renderer data enabling the changed content to be rendered on the second digital content renderer. A presentation layer (45) combines the two streams or tiers and provides the presenter with an interactive presentation or interactive canvas (40). The inter- (Continued)

active canvas (40) enables the presentation of content elements, which are available and utilises specialist tools available from the application layer (60). This provides both presenter (30) and viewer(s) (20) the ability to interact with the presentation or interactive canvas (40), whilst ensuring that face-to-face audio and/or visual elements from the communication layer (50) can continue uninterrupted. The presentation layer (45) also ensures that the presentation or interactive canvas (40) remains in synchronisation for all parties and that the presenter (30) and viewer(s) (20) have a consistent view at all times. The presentation layer (45) resides on both or all end points (viewer or presenter). The communication layer (50) may include a cloud-based server hosted by a webRTC platform provider, for example. The application layer (60) may include a cloud-based server hosted by ISP, for example. The use of indicators and traffic light tools may inform the presenter (30) that the viewer's interactive canvas (40) is in sync with their own canvas.

16 Claims, 7 Drawing Sheets

(51) Int. Cl.
  *H04N 7/15* (2006.01)
  *H04L 29/06* (2006.01)

(58) Field of Classification Search
  USPC .......................................................... 709/204
  See application file for complete search history.

(56) References Cited

U.S. PATENT DOCUMENTS

| | | | |
|---|---|---|---|
| 2008/0059656 A1* | 3/2008 | Saliba | H04L 67/1095 709/248 |
| 2008/0091772 A1 | 4/2008 | Kasik et al. | |
| 2010/0082747 A1 | 4/2010 | Yue et al. | |
| 2010/0257457 A1* | 10/2010 | De Goes | H04L 65/1093 715/751 |
| 2012/0210243 A1* | 8/2012 | Uhma | G06F 16/972 715/744 |
| 2013/0002532 A1 | 1/2013 | Raffle et al. | |
| 2013/0124664 A1* | 5/2013 | Fonseca, Jr. | H04N 21/43615 709/208 |
| 2013/0198298 A1* | 8/2013 | Li | H04N 21/4307 709/206 |
| 2014/0019882 A1* | 1/2014 | Chew | G06Q 10/10 715/753 |
| 2014/0122599 A1 | 5/2014 | Park et al. | |
| 2014/0258888 A1 | 9/2014 | Varadarajan | |
| 2015/0089372 A1* | 3/2015 | Mandalia | G11B 27/34 715/720 |
| 2015/0120825 A1* | 4/2015 | Waxman | H04L 67/36 709/204 |
| 2015/0149565 A1* | 5/2015 | Ahmed | H04L 51/04 709/206 |
| 2015/0261782 A1* | 9/2015 | McFerrin | G06F 16/27 707/625 |
| 2015/0341406 A1 | 11/2015 | Rockefeller et al. | |
| 2016/0119413 A1 | 4/2016 | Antipa et al. | |
| 2016/0149968 A1* | 5/2016 | Yin | H04L 65/4038 709/204 |
| 2016/0294799 A1* | 10/2016 | Miller | H04L 51/32 |
| 2017/0310926 A1* | 10/2017 | Patel | H04N 7/14 |

\* cited by examiner

INTERACTIVE DISPLAY SYNCHRONISATION

CROSS-REFERENCE TO RELATED APPLICATIONS

This application is a U.S. National Stage application under 35 U.S.C. § 371 of International Application PCT/GB2017/051512 (published as WO 2017/203283), filed May 26, 2017, which claims the benefit of priority to Application GB 1609440.1, filed May 27, 2016. Benefit of the filing date of each of these prior applications is hereby claimed. Each of these prior applications is hereby incorporated by reference in its entirety.

FIELD OF THE INVENTION

The present invention relates to a system and method for providing communications between separate devices and in particular, for synchronising interactive communications between web browsers.

BACKGROUND OF THE INVENTION

Interactive conference calls are useful forms of communication between two or more parties. Such facilities allow face-to-face meetings to take place using video and audio devices, as well as providing the ability to share screens and present documents, presentations, video and other digital works between participants as part of an interactive call. This can work well within an internal network inside an organisation. It can also be effective where participants operate in different locations but this is dependent on a reliable and high-bandwidth connection, usually over the public internet. A presenter cannot always be able to rely on the bandwidth of a participant when presenting material. Therefore, it may be the case that some or all of the presented material is not reliably presented to any or all participants. The presenter may carry on adding and changing material presented to a conference call oblivious of the fact that some or all of the participants are not receiving this material. In some systems, degradation in an internet connection restricts certain content from being presented. For example, a video stream may be paused whilst an audio stream, having a lower bandwidth requirement, is maintained so that at least some contact can continue. However, this leads to a significant degradation in the amount of information being provided to participants. This can be particularly problematic when the interactive call is part of a sales pitch or communication between supplier and customer.

It is instead preferable to maintain a level of service and information provided to participants or consumers of the information but this can be difficult to achieve with current architectures. Interactive webpages may be provided that allow consumers of information to browse and obtain different types of media. Whilst this can reduce bandwidth requirements (as real-time video and audio is not required) such unguided browsing may mean that certain material is overlooked, which can be particularly important when a customer is searching for a product or service to purchase. Furthermore, this may limit direct contact between the consumer and the provider.

Other options include the requirement that specific equipment or software (e.g. browser specific plug-ins) needs to be downloaded in advance of an interactive conference call. However, this decreases usability, takes more time and introduces further opportunities for a call to fail if the additional software or plug-in has not been installed correctly.

WO2016022033 describes a system in which two or more applications are operable to combine a session document with video data received from a video collaboration service, into a presentation for a user of separate device. The user is provided with a presentation comprising a video session via a first link and comprising a session document, which is updated by a second link. However, this system requires an application to be installed on each participating device and a separate controller to synchronise two devices. Furthermore, the controller is required to coordinate the video session and synchronise any updates.

Therefore, there is required a method and system that overcomes these problems.

SUMMARY OF THE INVENTION

Communications are provided over a network between at least two computers or terminals. Each computer may run a browser, application, mobile application or other digital work viewer or content renderer. The material that may be communicated may be any one or more of video, images, graphics, graphs, tables, surveys, and/or text and figures, for example. Further communications such as video and/or audio conference calls (or other real-time communications) may preferably be included. Communications are provided between the two computers using two or more separate channels, data streams or tiers. These channels may be separated physically or logically. For example, the separate channels may be formed over the same physical network connection (e.g. as internet protocol packets) but are logically separate as different layers or tunnels in the network connection. One of the data streams (e.g. a communication layer) carries messages and a second (or further) data stream (e.g. an application layer) carries content or digital work (either real time or from a data storage). A change in content may occur at one computer. For example, a presenter may introduce an image on to their screen or browser, add a graph or move an existing visual element or digital work. A message or communication carries information that indicates or describes the change in content. This change may be detected or otherwise captured. The message is transmitted through the first data stream and this information is received by the second or other computer (i.e. not the originating computer where the change occurred). The other computer may receive the message directly or it may be in the form of a second or other message (e.g. set by an intermediate entity on or within the first data stream). The second computer receives the message indicating that the content has changed (e.g. newly created, altered or deleted). The second computer then requests the changed content by issuing a request on the second data stream. The second computer is then sent the changed content over the second data stream. This changed content may be sent by the first computer (or browser) or sent (or retrieved from) a separate entity in communication with the second data stream (e.g. a database). The second computer then renders or displays the changed content using the browser. Either or both computers (or browsers) may change and/or receive content. In other words, the system may be two-way. In this way, synchronisation is maintained for content or digital material on both computers. The first and second channels may have separate bandwidth requirements and/or allocations. The first channel may also carry constant audio and/or video traffic between the two (or more) computers or terminals (e.g. a real-time video or audio call). Therefore, the call data may be kept on a separate channel to the messages, requests and supply of content or digital works.

In accordance with a first aspect there is provided a method for synchronising content between two or more digital content renderers or browsers, the method comprising the steps of:

receiving over a first communication channel a first communication indicating a change in content rendered on a first digital content renderer or browser;

transmitting over the first communication channel to a second digital content renderer or browser, a second communication indicating the change in content rendered on the first digital content renderer or browser;

receiving over a second communication channel a request from the second digital content renderer or browser for the changed content; and transmitting over the second communication channel to the second digital content renderer or browser data enabling the changed content to be rendered on the second digital content renderer or browser. Therefore, more control and better synchronisation may be achieved for content rendered across devices. The browsers may be web browsers, digital work renderers, native software, applications, mobile applications, or other GUI-based displays. Preferably, the request for the changed content may be issued in response (either directly or indirectly) to the first communication that notifies that a change has occurred.

Preferably, the method may further comprise the step of retrieving the data enabling the changed content to be rendered from a database. The data may be a digital representation of the content or digital work itself or an instruction or description of the change (e.g. a new position, size, colour or orientation on the screen). The data may be compressed or use references to content to reduced data transmission requirements.

Preferably, the method may further comprise the step of receiving over the second communication channel the data enabling the changed content to be rendered. In other words, the data are received by the second digital content renderer, which interprets or otherwise processes the data causing the content to be rendered.

Optionally, the data may be received from the first digital content renderer. The data may be received from other sources either partially on wholly.

Optionally, the content may be any one or more selected from: audio, video, image, text, and graphics. Other content may be used.

Optionally, the change in content may be: addition of content, removal of content, movement of content, change in colour, change is size, change in orientation, change in order, and/or change in volume (sound). In other words, the change may be an interaction with a GUI on the first digital content renderer (e.g. a presenter's browser) to alter the appearance, functionality or data displayed on the screen.

Optionally, the first communication channel may include a communication layer and the first communication is received by the communication layer the second communication is transmitted by the communication layer, and/or;

the second communication channel includes an application layer and the request is received by the application layer and the changed content is transmitted by the application layer. In other words, each communication channel, tier or data stream may contain intermediaries for retransmitting, reformatting or reprocessing the communications or messages.

Preferably, the communication layer and/or the application layer may be provided by one or more virtual servers. These may be cloud-based services, for example.

Optionally, the method may further comprise the step of detecting a change in content rendered on the first digital content renderer and in response generating the first communication including an indication of the change in content. The first communication may be generated in other ways, either directly or indirectly.

Optionally, the method may further comprise the step of communicating audio and/or video content between the first and second digital content renderers using the first communication channel. The audio and/or video content may be generated by a camera and/or microphone at each or both digital content renderer machines (e.g. a webcam or other device to provide video and/or audio calls between the digital content renderers).

Optionally, the method may further comprise the step of providing the first digital content renderer with an indication that the changed content has been rendered by the second digital content renderer. This can confirm that the change has propagated. An indicator may be shown on the first digital content renderer confirming the change (e.g. showing that a new digital work has been rendered), the time taken from the change to propagate or other metrics.

Advantageously, the method may further comprise the step of reducing or increasing the volume of data enabling the changed content to be rendered on the second digital content renderer according to a bandwidth of the second communication channel. For example, for a lower bandwidth channel (e.g. measured or predetermined) then a smaller volume of data may be used or selected to send the content. A larger volume may be used for a higher bandwidth channel. Therefore, quality may be optimised without sacrificing latency. Latency may be monitored and reduced or eliminated.

Optionally, the volume of data may be reduced or increased by changing the resolution of the changed content. Compression may also be used to change the volume or alternative (lower or higher resolution digital works) may be used depending on the available bandwidth (higher resolution for higher bandwidths) or other system resources.

Optionally, the method may further comprise the step of measuring a time from the change in content rendered on the first digital content renderer to the rendering of the changed content on the second digital content renderer. This may be fed back or displayed on the first digital content renderer or added to recorded metrics, for example.

According to a second aspect, there is provided a system for synchronising content between two or more digital content renderers comprising:

a first communication channel;

a second communication channel;

at least one processor; and memory storing computer-executable instructions that, when executed by the at least one processor, cause the system to:

receive over the first communication channel a first communication indicating a change in content rendered on a first digital content renderer;

transmit over the first communication channel to a second digital content renderer, a second communication indicating the change in content rendered on the first digital content renderer;

receive over the second communication channel a request from the second digital content renderer for the changed content; and transmit over the second communication channel to the second digital content renderer data enabling the changed content to be rendered on the second digital content renderer.

Optionally, the at least one (or more) processor executes a virtual server.

Preferably, the system may further comprise:

a communication layer configured to receive the first communication and to transmit the second communication, and/or an application layer configured to receive the request and to transmit the changed content.

Preferably, the system may further comprise a database (or databases at the same or different locations) configured to store the data enabling the changed content to be rendered.

Preferably, the first digital content renderer and the second digital content renderer may be WebRTC compliant browsers. Either or both may be WebRTC compliant. This may include browsers or applications (e.g. a mobile application).

Advantageously, the first communication and/or the second communication may be application programming interface, API, messages.

Preferably, the system may further comprise a video camera and/or microphone provided locally to the first and/or second digital content renderer.

Optionally, the first communication channel may be further configured to communicate audio and/or video content generated by the video camera and/or the microphone, between the first and second digital content renderers.

According to a further aspect, there is provided an application development tool for building the digital content renderer environment used to present, change and generate content to be displayed or rendered on another digital content renderer. The application development tool enables templates to be generated and customised to improve the time taken to build new interactive functionality. The application development tool allows for templates to be built once and reused or to automatically generate new templates for use in different applications (e.g. browsers or apps that don't use webRTC or different device types) or for different operating systems or environments.

According to a further aspect, there is provided a set of indicators allowing a presenter on one browser, digital content renderer or display tool to determine what is being displayed or rendered on a second (or more) browser or display tool. For example, when a presenter changes, adds, moves or otherwise alters content or digital works on their own browser or display tool then one or more of the indicators can confirm that the changes have been made on the second browser, digital content renderer or display tool. This avoids the need for screen sharing but allows better control of a presentation. One or more of the indicators can display metrics, information or metadata describing the performance of the content provided to the second browser. For example, these metrics may indicate latency or delay in propagating changes to content. Action may be taken to reduce latency (e.g. allocating more resources or limiting functionality, resolution or increasing compression). Compression may optionally take place in advance of a call or separately. The indicators may also show the available or provided resolution or other quality measure for each object, digital work or data displayed or rendered on the other digital content renderer or browser. For example, where bandwidth is limited then this may described on the presenting digital content renderer or browser. This may be in real-time with resolution of objects displayed being changed dynamically to maintain synchronisation whilst optimising bandwidth use. The indicators may be traffic light-type, dials, graphical, numerical or colour-based, for example. The indicators may be limited to be presented on only one browser (a presenter) although the other browser (viewer) may also generate interactive material (e.g. enter text, select options, etc.)

According to a further aspect, a system may record, store or display in real-time data describing individual or overall presentation sessions. For example, the time for a presentation to run may be recorded and/or the time for individual elements to run or when and where they were executed or shown within a presentation. Presentations may be two-way (or more) and each change, interaction, message, audio, video or other communication may be captured and recorded. A further example of data about a presentation or interaction between separate digital content renderers or browsers being captured includes capturing acknowledgments or acceptance of receipt of an item of data (e.g. the signing or acceptance of a contract). The interactions may be fully recorded and later audited. The recordings may be secured or encrypted.

According to a further aspect, there is provided a method and system for auditing and/or recording presentations or interactions between the digital content renderers or browsers described throughout this disclosure. The recordings may include video and/or audio interactions.

Any aspect or feature of any aspect may be used with any other aspect or described feature in any combination.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example. The network and communication channels may be implemented as internet protocol, IP, packet systems. Data may flow as http, https, HTML, HTML5, XML, markup languages, or may take other forms.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

In one example implementation, the system uses WebRTC (see https://webrtc.org/retrieved 9 May 2016) to provide real-time communications across the internet or other network. The system provides a collaborative environment for enabling presentations (e.g. for products and services). The system may also enable remote transactions to take place and be recorded, audited or retrieved. The system integrates voice over IP (VoIP) technology including a presentation canvas, which provides assets or digital works to improve a presentation or interactive call. Analysis, feedback and meta-data describing a presentation may be captured. Digital works may be presented along with audio and/or video. These digital works may be in different forms including: documents, images, film, and interactive multi-media, for example.

WebRTC provides internet browsers with standardised real-time communications (RTC) capabilities. This may be combined with JavaScript APIs and HTML5 code, for example. Communication may be bi or multi-directional, including audio telephone and video communication between parties (e.g. a presenter and a consumer or viewer).

The system provides synchronised content between participants in a presentation (e.g. conference call) using a presenter component without the need to download and install additional software or plug-ins. For browsers that do not support webRTC then a downloadable application (e.g. mobile app) may be used. This applications, app or apps work across all major platforms (e.g. Windows, OSX, iOS, etc.) Browser to browser communication allows the system to encompass dual (or multiple) streaming technology. The system may accommodate multiple presenters, simultaneous presentations and separate stores of content.

In one example, the application (mobile or desktop) used instead of a webRTC compliant browser may be a wrapper for a Chromium based browser which does support the use of WebRTC. This uses guest user to participate in a presentation session. Therefore, a user may use the system even if they don't have a browser installed on their machine that doesn't support webRTC.

The system may comprise five or more elements including but not limited to:
  i. Visual
  ii. Audio
  iii. Applications/Content
  iv. Specialist/Collaboration tools designed for the Presenter
  v. Multi-way Interactive 'Presentation Canvas'

Figure 1:
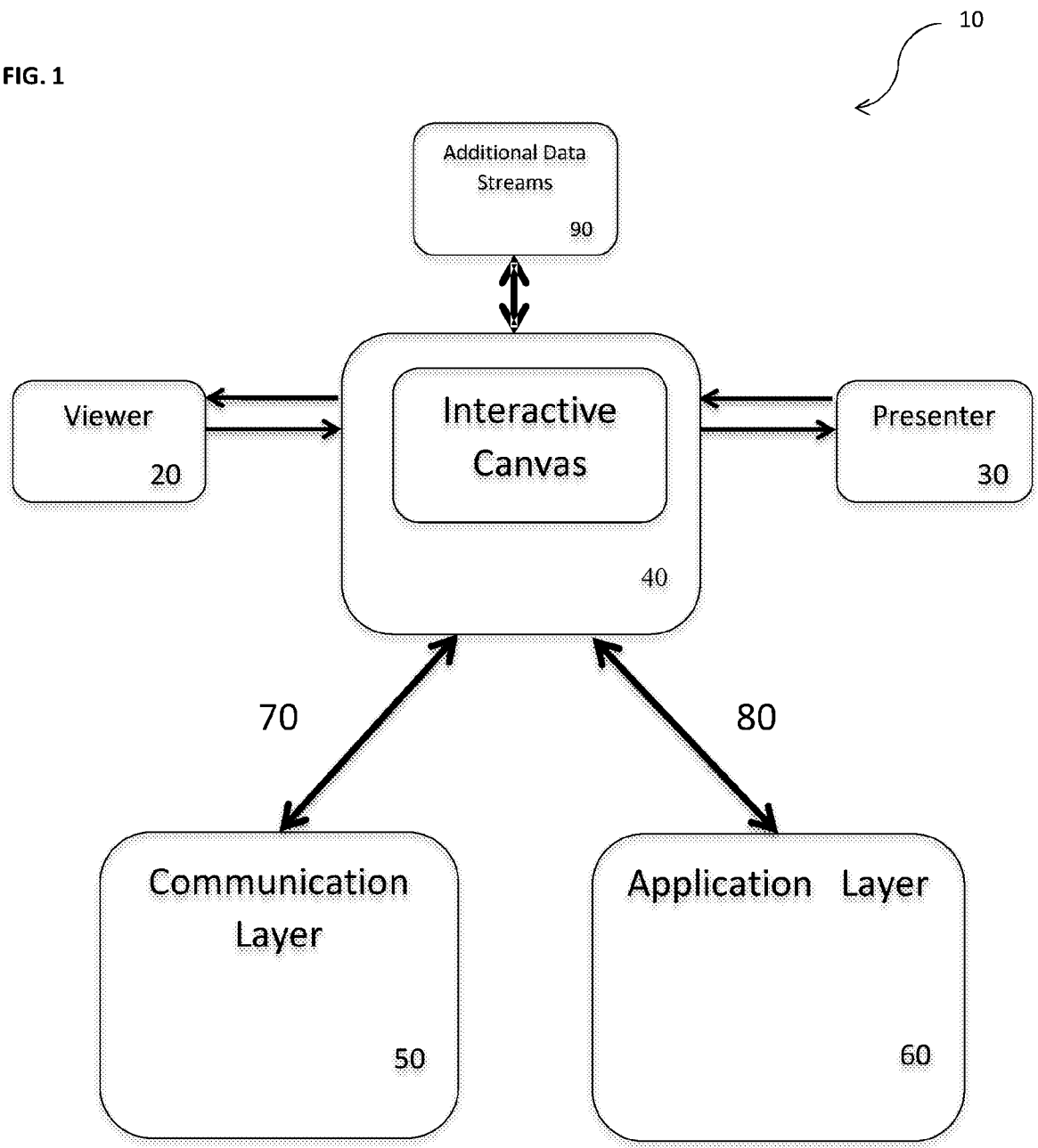
FIG. 1 shows a schematic diagram of a system for synchronising content between two or more digital content renderers, browsers or terminals.

The first four elements listed above, the visual, audio, applications/content and specialist/collaboration tools are delivered using two or more distinct data streams. FIG. 1 illustrates schematically the structure of the system 10. A first data stream or channel 70 provides access to a communication layer (tier 1) 50, which enables the video and/or audio elements. A second data stream or channel 80 provides access to an application layer (tier 2) 60, which enables the application/content and specialist tools designed for the presenter.

Content elements form part of the application layer (tier 2) 60 and may include a variety of mixed media, including documents, imagery, film, and specialised interactive multimedia components, which may be required by a presenter during a presentation. Content available via the application layer 60 is customisable for every user, client or presenter, in order for them to create a presentation environment.

A presentation layer combines the two streams or tiers and provides the presenter with an interactive presentation or interactive canvas 40. The interactive canvas 40 enables the presentation of content elements, which are available and utilises specialist tools available from the application layer 60. This provides participants (both presenter 30 and viewer(s) 20) the ability to interact with the presentation or interactive canvas 40, whilst ensuring that face-to-face audio and/or visual elements from the communication layer 50 can continue uninterrupted.

The presentation layer also ensures that the presentation or interactive canvas 40 remains in synchronisation for all parties and that the presenter 30 and viewer(s) 20 have a consistent view at all times.

The presentation layer is a base application that may:
  1. Contain all common functionalities for interaction with the interactive canvas 40 such as drag and drop, video player, image viewer etc.
  2. Provide the ability to load all content interactively from the application layer 60 on to the interactive canvas 40.
  3. Handle connections in the communication layer 50 between a communication server utilised in the first tier and connecting with a database server within the application layer 60.
  4. Ensure that the view of the canvas remains in synchronisation for all parties and at all times regardless of the content being displayed, including videos and images.

Another feature of the presentation layer in this example, is the use of one or more display adjusting components to adjust images to appropriately fit various sized display screens presented in real-time. A large display screen may down-size displayed images and may include more background video content. Similarly, a smaller display screen may up-size a displayed image and so include little or no background video content, thereby providing clearer detail within the image. Adjusting an image to an appropriate fit is achieved by using one or more display adjusting components at a sending client, a receiving client, and/or a multi-media conferencing server.

The application layer 60 (delivered using the 2nd tier) includes elements that are used by the presentation layer and may contain or hold:
  1. Necessary information about connections with the services (i.e. links, service keys and passwords).
  2. Information regarding tailored look and feel information (i.e. component positions, client logos and pictures).
  3. Custom functionality on a client by client or user by user basis.

The application layer 60 communicates with a client or organisation database to retrieve the data required for display by the presentation layer and also communicates with a web services component using application programming interfaces (API) to handle and process any one or more of the following:
  1. Login users.
  2. Sending invitations to attend a real-time presentation.
  3. Setting up planned and instant meetings.

4. Allowing synchronization of client database users or creating generic user structure.

5. Allowing synchronization of data gathered during a communication between the presenter 30 and the viewer 20 to enable further measurement, monitoring and tracking to be reported and storing these data within a database.

The communication layer 50 (delivered using the first tier 70) includes a function to handle the communication (audio and video) between the presenter 30 and the viewer 20. It also handles messages received from the presentation layer of the presenter 30 to the presentation layer of the viewer(s) 20 to providing information or a signal that content is being displayed on the presenters canvas or this content has changed. This allows the viewer's canvas to respond and request the changed content in response and so keep both canvases in synchronisation.

This layer contains a communication server. This communication server performs any one or more of the following tasks:

1. Receives requests from the presenter 30 to create viewing rooms (i.e. logical areas for presentations to take place) and authenticate these requests.

2. Returns to the presenter 30 the requested room details to enable these to be stored using the application layer 60 and make these available to invited viewer(s) 20.

3. Gives connected user rights to all participants.

4. Handles direct connections for sending audio and/or video streams.

5. Handles shared objects and a white board (sequential graphical) workflow.

6. Responsive to user interface design. This is to ensure that the system has a consistent appearance, which is independent of end user device (e.g. desktop, TV, tablet or mobile device).

The final part of the communication layer 50 handles communication with the communication server. This is achieved using API's to provide server-side infrastructure required by the application layer 60 and associated services, including but not limited to:

1. User discovery and communication.

2. Signalling Required for audio and/or video streams and data requests.

3. NAT/Firewall traversal.

4. Relay servers in case direct communication is unavailable.

As part of the communication layer 50, the system enables the bidirectional (or multi-directional) transmission of video between the presenter 30 and the viewer 20 or viewers, through transmission of video from a camera (e.g. webcam) of the presenter 30 to the remote computer or mobile device of the viewer 20 and vice versa. Transmission of video from the viewer 20 to the presenter 30 is preferably at the sole discretion of the user and may be restricted from being automatically set by the presenter 30.

In addition to the data streams described above, the system is capable of handling additional data streams 90 (e.g. email or instant message communications) and combines them within the presentation layer. One of these additional streams may handle email communications, which may be used for the presenter 30 to invite the viewer(s) 20 to attend a presentation. This email communication may be sent prior to presentation and the presenter 30 may also have the ability to send further communications during a presentation to enable one or more further viewers to join the presentation.

Further additional features of the system 10 include a user development environment that includes templates and widgets for client content to be added and the ability to create new templates as required. These templates are published with the added content on the application server for use within the presentation layer of the presenter 30. This provides more effective customisation of the product for specific clients or users. Additionally, it may provide the ability to develop further templates without the need to write code, making the production of new user requirements both rapid and de-skilled.

Further features of the system 10 may be incorporated as aids to presenters 30 to ensure they have better control of their environment when in communication with their viewers. These may include any one or more of the following:

1. The use of indicators and traffic light tools to inform the presenter 30 that the viewer's interactive canvas 40 is in sync with their own canvas.

2. The provision of metrics and timings of applications to control the running of a presentation and for use after the presentation, e.g. for training or performance purposes.

3. Online and offline modes may be provided so that the system has two modes. This provides the ability to build a single environment for particular user content, which may be available as a single presentation. This material may be available whether the presentation takes place online with the video and/or audio streams connecting the remote users or presented offline without the need for video and/or audio streams where the presenter 30 and viewer may be in the same location, for example.

Preferably, the product is web-based and is accessible to any authorised user with an internet connection anywhere in the world, using a standard web browser and available on desktop PCs, tablets and smartphones or other mobile devices. However, the internet connection is not a requirement as an offline mode may be used. The technology used in the application layer is predominately HTML5 and JavaScript and the database technology used may be SQL based. Example databases may be MySQL or Microsoft SQL, although any database may be used.

FIG. 1 illustrates multiple data streams within the system 10 and how these separate data streams are combined into a single application and synchronised for the purpose of an interaction between a presenter 30 and one or more viewers 20 for any particular presentation. The presentation layer resides on both or all end points (viewer or presenter). The communication layer 50 may include a cloud-based server hosted by a webRTC platform provider, for example. The application layer 60 may include a cloud-based server hosted by ISP, for example.

The multiple data streams may be kept separate by default and only visually put together in the end user's browser. Therefore, they may appear to be as one stream but they are never combined. This is achieved by the use of layering in the browser, i.e. the content may be displayed on a layer above the video and audio stream.

The interactive canvas 40 is used by the presenter 30 to enable the presenter 30 to display any content elements contained within the application layer 60 whilst retaining video and/or audio streams for both the presenter 30 and any viewers 20 using the communications layer 50.

To ensure that the view of the interactive canvas remains in sync for all parties during a presentation and that the presenter 30 and viewer's view is the same regardless of the content being displayed, the presentation layer of the presenter 30 communicates with both the application and communication layers continually throughout the presentation.

Figure 2:
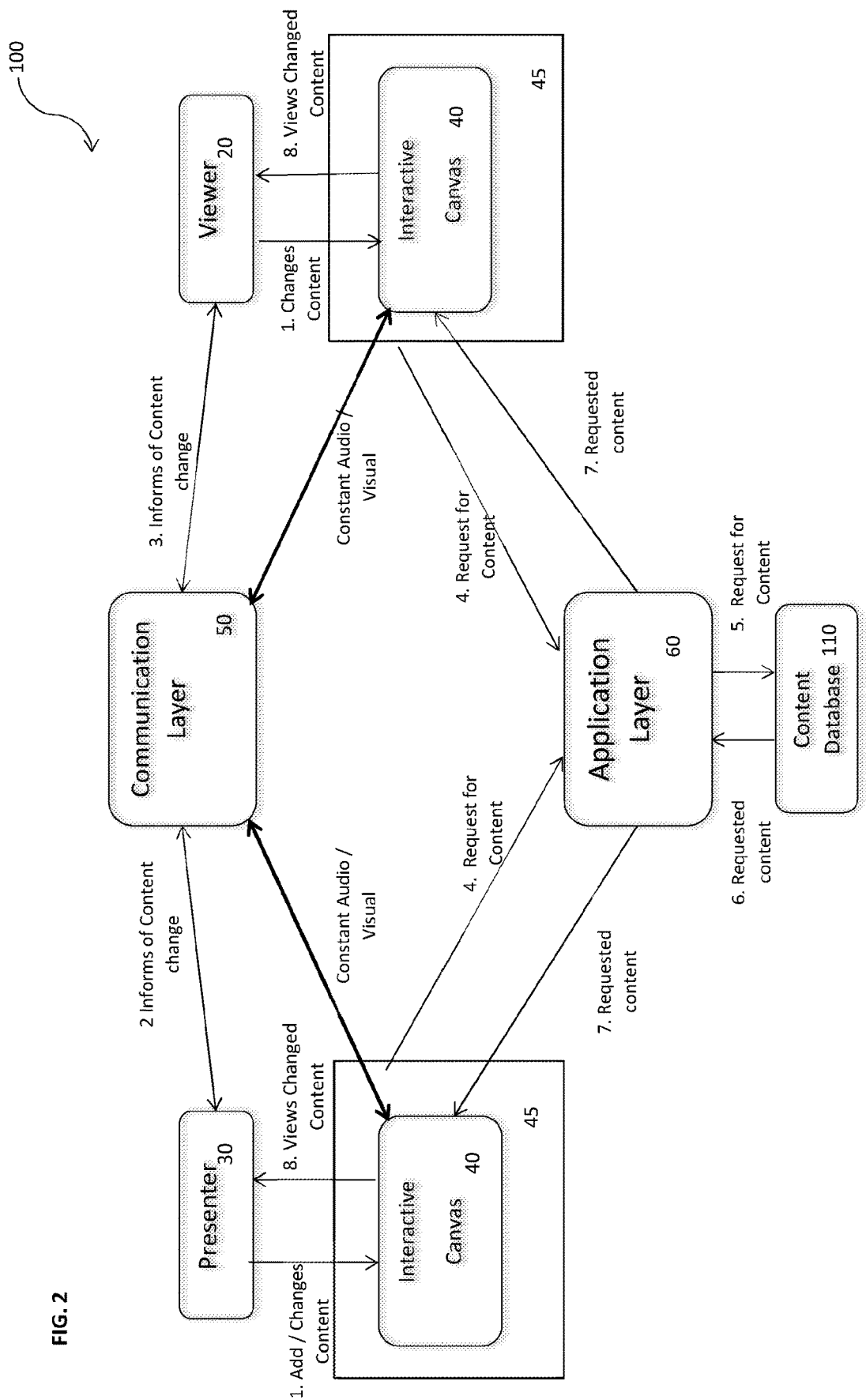
FIG. 2 shows a flowchart of information moving within the system of FIG. 1.
Figure 3:
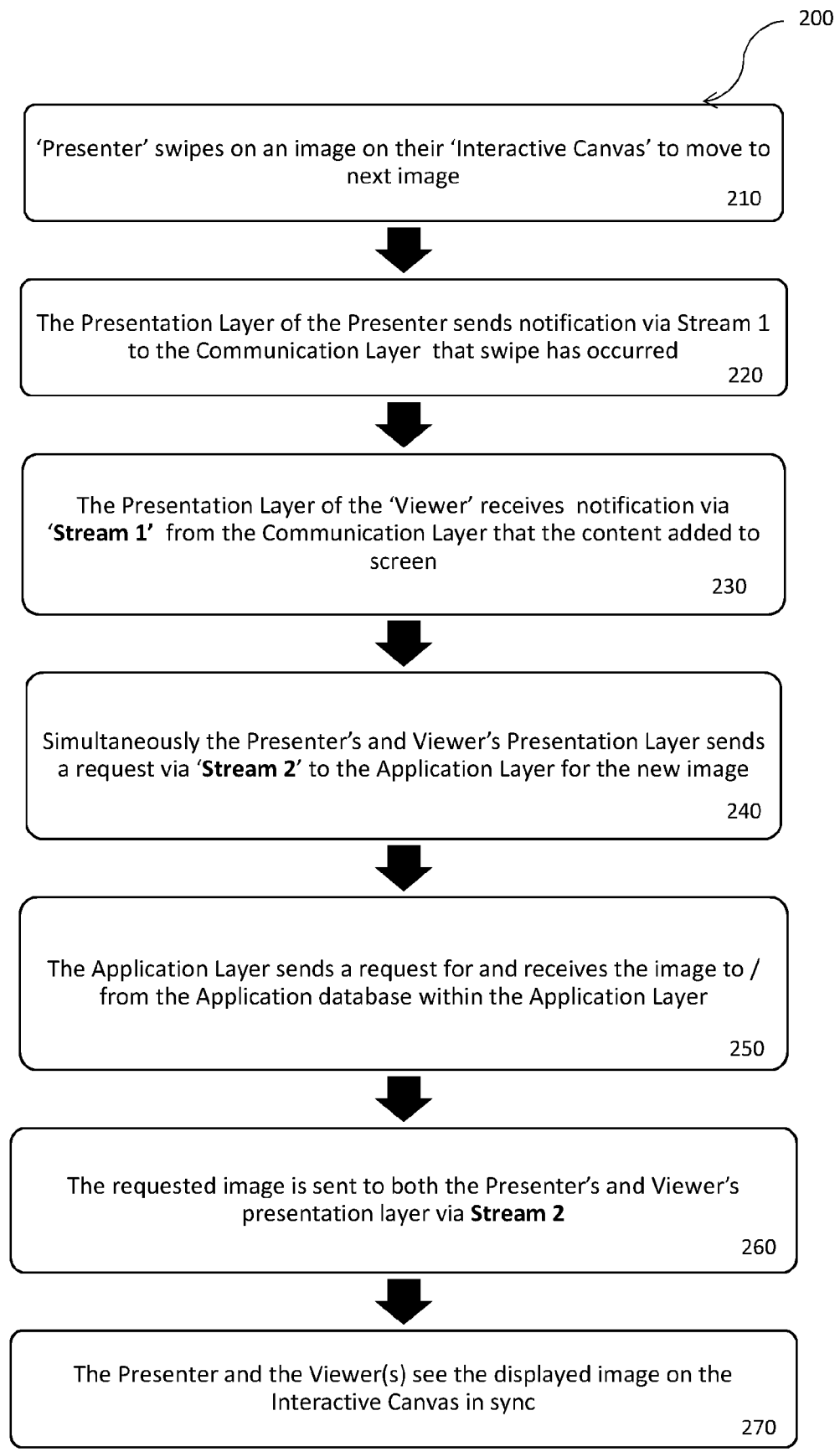
FIG. 3 shows a flowchart of a method for using the system of FIG. 1.

FIG. 2 shows a schematic representation of the communication flow during a presentation when the presenter 30 either adds, deletes or changes content that is displayed on the interactive canvas 40. FIG. 3 shows a flow chart of an example method 200 used to operate the system 10. In this example, the presenter 30 swipes an image on their interactive canvas 40.

FIG. 3 shows a flowchart of an example method 200 for using the system 10. In this example, the presenter swipes an image on their interactive canvas 40 and the action is synchronised between the presenter's browser and the viewer's browser.

At step 210, the presenter 30 swipes on an image on their interactive canvas 40, which has the effect of moving to the next image in a set of images (other actions may take place). At step 220, the presentation layer of the presenter 30 sends a notification or message over the first data stream 70 or communication channel to the communication layer 50. This message includes information describing the event (i.e. a swipe has meant that a change in content has occurred). At step 230, the presentation layer of the viewer 20 receives the message or notification, again over the first data stream 70 or communication channel from the communication layer 50 describing the event (i.e. that there has been a change in content). At step 240, the viewer's presentation layer sends a request over the second communication channel or second data stream 80 to the application layer 60 for the new image. The presenter's presentation layer does the same, in this example implementation. At step 250, the application layer 60 issues a request for and in response, receives the image data from the content or application database 110. At step 260, the requested image is sent to both the presenter and viewer's presentation layer over second communication channel or second data stream 80. At step 270, the presenter 30 and the viewer 20 see the displayed image on their browsers or interactive canvas 40. Therefore, this occurs as a synchronised action. As an enhancement of the presentation layer, the presenter 30 may be informed within the presentation canvas on their browser when the requested image is displayed on the viewer's presentation or interactive canvas 40 to ensure they are in control of the presentation experience of the viewer or viewers.

Figure 4:
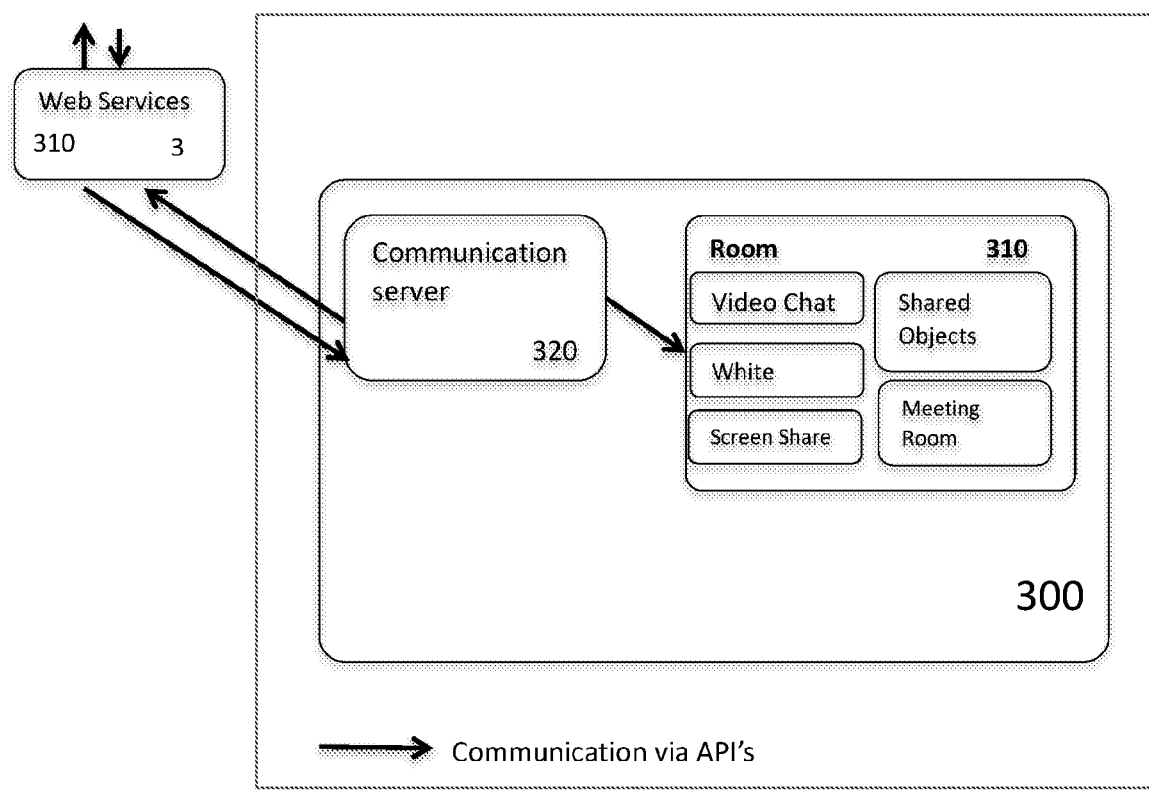
FIG. 4 shows a portion of the system of FIG. 1.

As shown in FIG. 4, the communication layer 50 may be implemented within a cloud-based server 300 that configures a virtual meeting room 310 for display within the presentation layer of the presenter 30 and viewer(s) 20. The virtual meeting room incorporates a communication server 320 that is linked with web services 310. The server 300 is a software layer that establishes framework, navigation, platform and management for specific user content held within the application layer 60. In one example implementation, the communication layer 50 is built on three key concepts: sessions, connections, and streams. The communication layer 50 and the application layer 60 may be hosted by the same or different cloud providers or run within the same (or different) physical or logical server. The web services may be .NET and .PHP based web services. Web services may be utilised for creating the rooms in the first instance and then utilise web services for any APIs. An example API is for one used to retrieve product information from a back office data store. These web services and APIs may also be used for retrieving and pushing back customer data to and from a back office CRM systems, for example A session represents an entire video chat environment. It is a collection of connections that publish and subscribe to streams. A session also dispatches events representing changes in content within the session. At a high level, the session operates as a virtual video chat room.

A connection is a logical abstraction of a single browser tab's interaction with a session. The connection is the mechanism through which a browser publishes and subscribes to streams within a session. A stream is a single audio-video signal, which includes a presenter or viewer's published webcam and microphone feed (if present or used).

Each presenter's browser or viewer's browser will typically open a single connection to a given session. Through that connection, the browser may choose to publish an audio-video stream to the session. Using that same connection, the browser may also subscribe to one, some, or all of the other published audio-video streams available in that session.

However, while these scenarios are the norm, they are not architectural constraints. A browser page may have more than one connection open at a time, whether to the same or other sessions. A browser may publish multiple streams concurrently to a session, or to other sessions. The session provides a video conferencing crossbar switch in the cloud. The presentation layer at each endpoint (e.g. browser) controls or decides which session to connect to, which streams within that session to display, and whether or not to publish to that session in return.

Additional security may be added to any or all implementations. When a browser or other endpoint connects to a session, it may authenticate itself by providing a server-generated token. Password protection may also be used to improve security. Sessions can be seen as virtual video chat rooms that may be joined and tokens may be keys to be used for the security of each room 310. Tokens may have expiration dates or other conditions and they may be assigned roles (such as publisher, subscriber, and/or moderator), which enables them to provide different privileges within a session.

When generating a token, it may be associated with a role (such as publisher or moderator). Each role corresponds to set of permitted actions. This ensures that the presenter 30 is provided with the presenter's view (e.g. including status and metric information) and has access to the content contained within the application layer 60 to display on the interactive canvas 40.

Publishers and subscribers interact with the communication layer 50. Within a browser's connection to a session, important objects are the publishers and subscribers. When a presenter 30 creates and then joins a room 310 displaying the presentation or interactive canvas 40, the presenter 30 publishes audio and/or video streams using the communication server 320 and this may be consumed by the viewer(s) 20. If a viewer 20 grants relevant permissions within their browser and publishes their audio-video stream, then the presenter 30 subscribes to that stream and the stream is displayed on the presentation layer of the presenter 30.

A viewer consumes an audio-video stream over the communication server 310 and this stream is displayed on the viewer's presentation or interactive canvas 40. At the same time, if the viewer 20 has granted their browser the correct permissions, then the viewer 20 publishes audio-video streams via the communications server 320 and this made available for the presenter 30 to consume.

Figure 5:
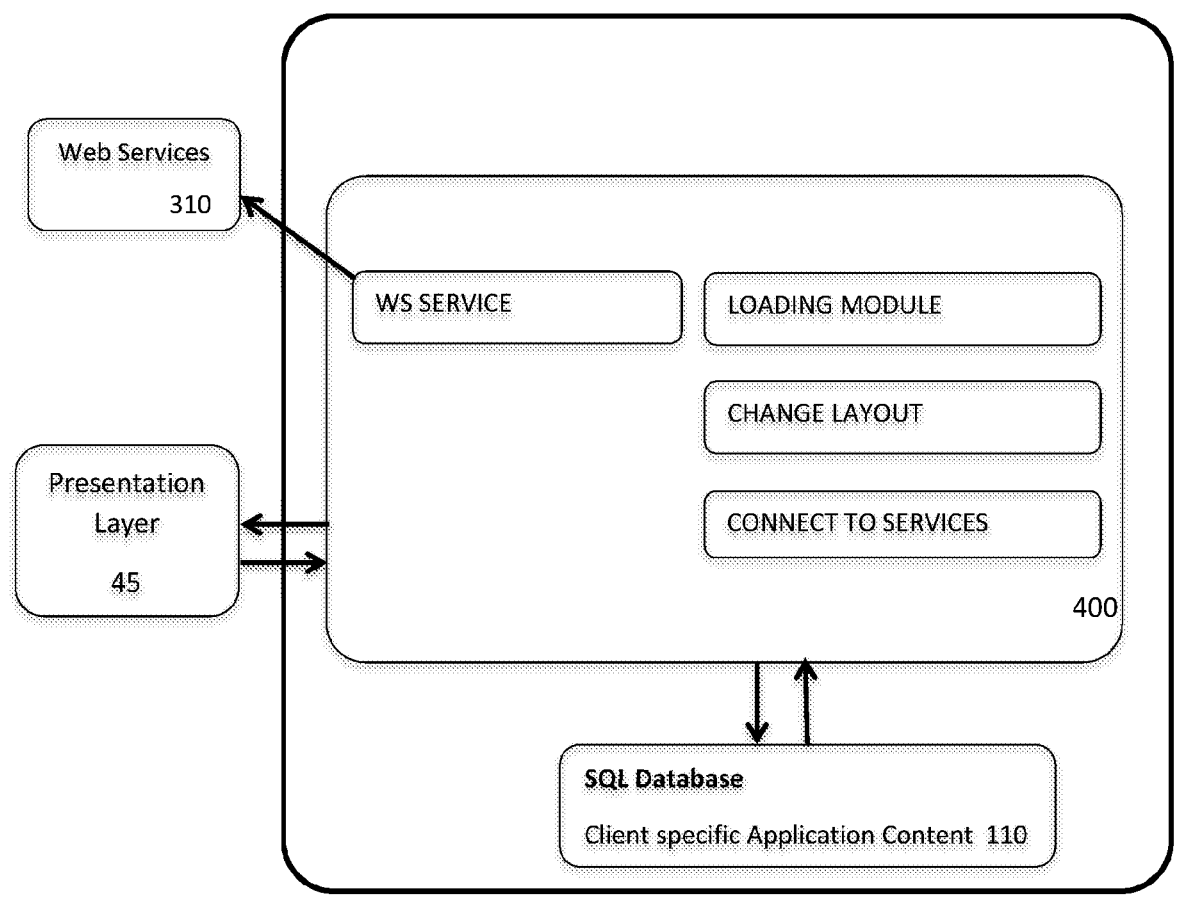
FIG. 5 shows a further portion of the system of FIG. 1.

FIG. 5 shows a schematic diagram including additional details of the application layer 60. The application layer 60 delivers content elements (modules) that are loaded by the presentation layer 45 and contains or holds any one or more of:

All the necessary information about connection with the services (i.e. links, service keys and passwords).

All the information regarding a customised look and feel (i.e. component positions, user logos and pictures).

All custom functionality on a user by user basis

The application layer 50 may also be cloud based. In this example, the cloud based application layer 400 may include other tools, which may be connected to the interactive canvas 40 via the presentation layer 45. These tools may include any one or more of: Sales script overlays to display any script that the presenter 30 may be required to follow (e.g. for use in call centres).

Pitch prompts such as timings of current presentation against standard expected timings.

Notification when content has been displayed on the viewer's display to ensure that the presenter 30 is aware of the view of the viewer 20 to avoid confusion.

These tools may be integrated into the interactive canvas 40, ensuring they are only visible to the presenter 30 and not seen by the viewer 20. Displayed objects may comprise, for example, an image of the presenter 30, an inanimate object, or an electronic display of text, graphics, or other matter to be interactively used during a presentation.

Figure 6:
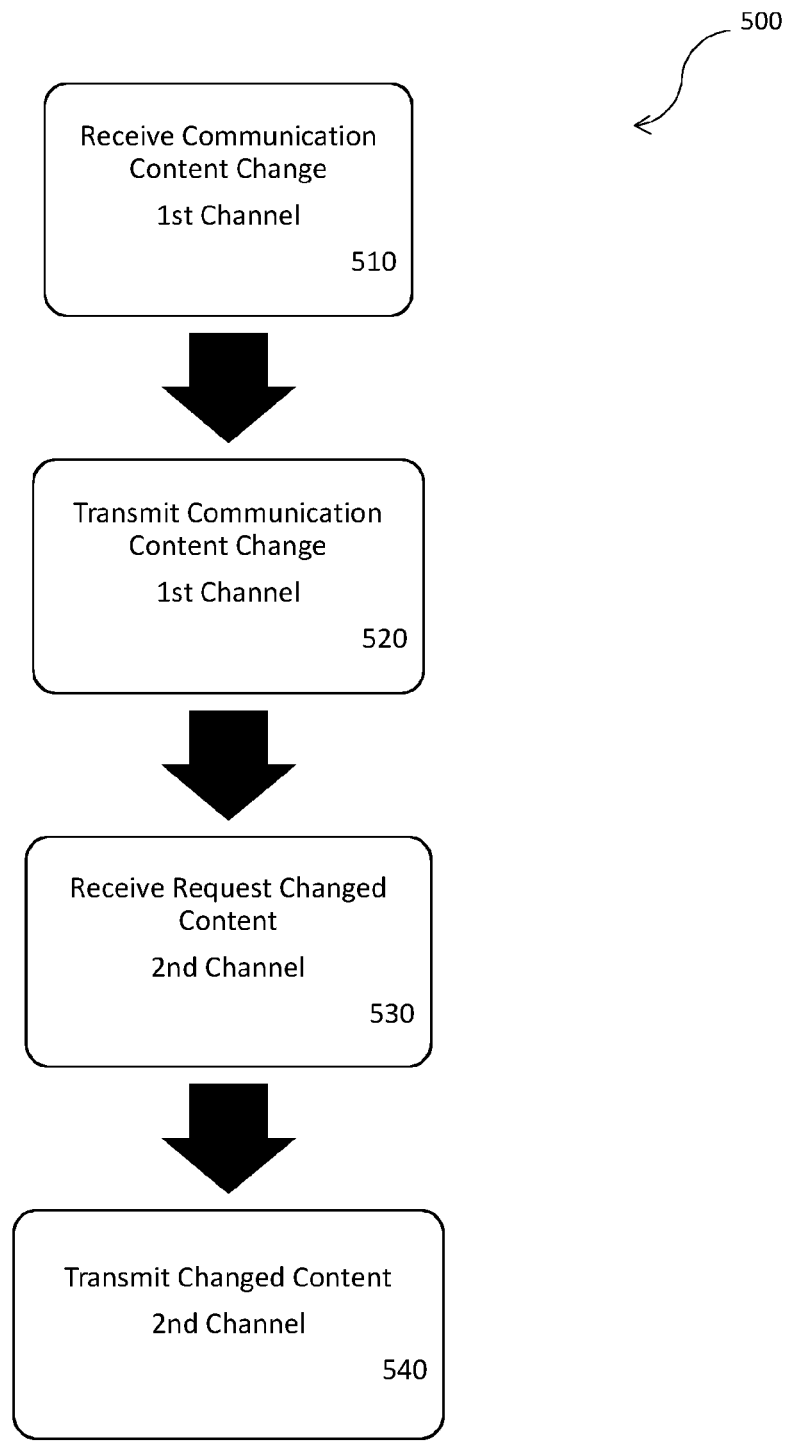
FIG. 6 shows a flowchart of a further method to be used by the system of FIG. 1.

FIG. 6 shows a flowchart of a more general method 500 to be used with the system or systems described above. At step 510, a first communication is received over a first communication channel indicating that content within one browser has changed. At step 520, a second communication is transmitted to a second browser either describing or indicating that the content has changed. At step 530, a request is received from the second browser for the changed content. This request is received over a second communication channel. At step 540 the changed (requested) content is sent over the second communication channel to the second browser. In some implementations, the requested content is also sent to the first browser (e.g. following a request from the first browser or absent any request).

Figure 7:
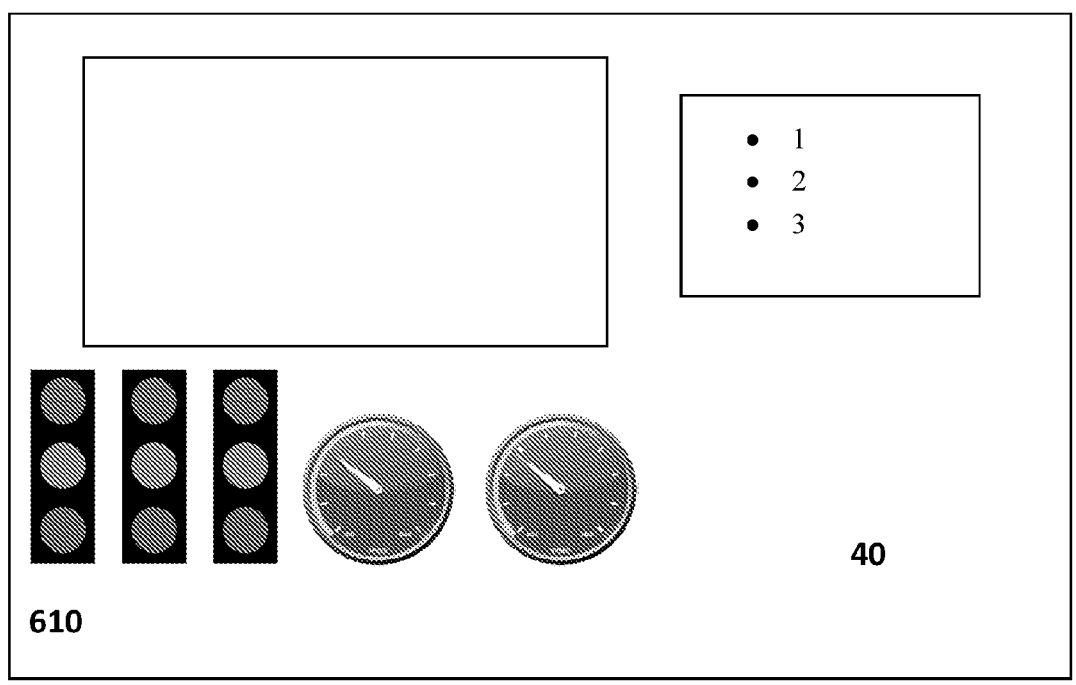
FIG. 7 shows a schematic diagram of a screen shot generated by the system of FIG. 1.

FIG. 7 shows a schematic diagram of a screen shot from the presenter's browser. In particular, this screen shot illustrates the interactive canvas 40 provided to the presenter 30 during a presentation. Indicators or traffic lights 610 show different properties of the presentation. For example, the bandwidth of the network connection used by the viewer 20 may be given a rating. Green may indicate a sufficient bandwidth to allow all of the material to be received by the viewer's browser. Amber may indicate that the bandwidth was approaching a predetermined or dynamic limit for the material and/or video stream currently in use. Red may indicate insufficient bandwidth, which may allow the presenter 30 to stop using high resolution or high data objects such as video recordings. Dials, graphs or numbers may also be used as indictors.

Bandwidth management may be handled by an application server that forms part of the communication layer. For example, this may be handled by a cloud based server or servers. Intelligent quality control features may be used that incorporate Dynamic Frame Rate Controls that may be adjusted based upon the available bandwidth for all parties. In one example, there may be three data parts that form part of a prioritisation method and these are: video, data and signals (e.g. messages). If bandwidth is limited then the video aspect may be dropped. If bandwidth remains limited the then audio may be dropped. The signals or messages may never be limited, as these will only not operate when there is no bandwidth available, i.e. no internet connection. At this point message may be displayed informing users that the connection is lost and the system automatically reconnects all parties when the connection is restored.

During a presentation, monitoring of the display of changes and objects on the viewer's screen may take place. As well as feedback being provided to the presenter 30 (e.g. using the indicators) other automatic or active control may take place. For example, when a viewer's display latency increases then alternative or equivalent objects may replace those being selected or changed by the presenter 30. For example, should the presenter select a high resolution image of a product to be displayed then the system (e.g. the application layer 60) may instead use the feedback data to decide to retrieve a lower resolution image of the same product. This can help to maintain synchronisation without limiting functionality.

The system may also include an application development tool for building the browser environment used to present, change and generate content to be displayed or rendered on another browser. The application development tool enables templates to be generated and customised to improve the time taken to build new interactive functionality. The application development tool may include modules that generate the interactive canvas 40 used within the presentation layer 45. Whilst the presenter 30 may control items or digital works within the interactive canvas 40 (or desktop workspace) during a presentation, the application development tool may be used to build a template for the presentation. The template may include a workflow and/or data items to be stored and retrieved from the database 110 at particular points in a presentation. The application development tool may also include metric markers to be used to store metrics for individual or groups of presentations (e.g. their duration, participants, content displayed, audio and/or video streams to be recorded, acceptance of contracts, etc.)

Metrics, meta-data, and other information may be recorded during a presentation. For example, the timings of objects being presented may be recorded. Contractual agreements may be recorded. For example, authorisations, payment, acceptance of terms and conditions displayed to a viewer 20 may be recorded along with a time, data and non-repudiation tokens (e.g. digital signatures).

The application development tool (or another tool or module) may further generate alternative templates and/or workflows to be used in different environments. For example, a desktop-based presentation template may be built. This may include an interactive canvas 40 having a larger area for display on a PC monitor. However, this may not be suitable for a mobile device browser with a much smaller screen. Therefore, the application development tool may regenerate a presentation automatically using the desktop presentation as a starting point. This may include altering the size and resolution of different objects used within the presentation.

An offline version of a presentation may be generated. This may be used without a network connection, for example. Therefore, the offline version does not require a video or audio connection between two or more browsers (a single display may be used).

As will be appreciated by the skilled person, details of the above embodiment may be varied without departing from the scope of the present invention, as defined by the appended claims.

For example, while digital content renderer or browsers have been described, other rendering or display tools be used to both capture presentation features or display or render the captured features. This may include mobile applications, client-server executables, or other programs.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for synchronising content between two or more digital content renderers, the method comprising steps of:
   during an interactive real-time presentation session including one or more of video and audio:
   receiving, over a first communication channel, a first communication describing an event representing a change in content rendered on a first digital content renderer acting as a presenter;
   transmitting, over the first communication channel to a second digital content renderer acting as a viewer, a second communication indicating the event;
   receiving, over a second communication channel, a request from the second digital content renderer for data enabling the change in the content represented by the event, the request from the second digital content renderer being responsive to the first communication;
   receiving, over the second communication channel, a second request from the first digital content renderer for the data enabling the change in the content;
   requesting, over the second communication channel from a database external to the first digital content renderer and to the second digital content renderer, the data enabling the change in the content;
   receiving, over the second communication channel, the data enabling the change in the content; and
   transmitting, over the second communication channel to the first digital content renderer and to the second digital content renderer, the data enabling the change in the content, wherein the change in the content is synchronously rendered on the first digital content renderer and the second digital content renderer,
   providing the first digital content renderer with an indication that the change in the content has been rendered by the second digital content renderer; and
   wherein, during the interactive real-time presentation session, the first digital content renderer and the second digital content renderer each act as both the presenter and the viewer providing two-way synchronization.

2. The method of claim 1, wherein the data enabling the change in the content is received from the database.

3. The method of claim 1, wherein the content comprises one or more of: audio, video, image, text, and graphics and, and wherein the change in the content is one or more of: addition of content, removal of content, movement of content, change in colour, change is size, change in orientation, change in order, and change in volume.

4. The method of claim 1, wherein at least one of:
   the first communication channel includes a communication layer and the first communication is received by the communication layer and the second communication is transmitted by the communication layer; and
   the second communication channel includes an application layer and the request is received by the application layer and the data enabling the change in the content is transmitted by the application layer.

5. The method of claim 1 further comprising a step of detecting the event representing the change in the content rendered on the first digital content renderer and in response generating the first communication describing the event.

6. The method of claim 1 further comprising a step of communicating at least one of audio and video content between the first digital content renderer and the second digital content renderer using the first communication channel.

7. The method of claim 1 further comprising a step of reducing or increasing a volume of data enabling the change in the content to be rendered on the second digital content renderer according to a bandwidth of the second communication channel.

8. The method of claim 7, wherein the volume of data is reduced or increased by changing a resolution of the content.

9. The method of claim 1 further comprising a step of measuring a time from the event representing the change in the content rendered on the first digital content renderer to rendering of the change in the content on the second digital content renderer.

10. A system for synchronising content between two or more digital content renderers comprising:
    a first communication channel;
    a second communication channel;
    a database configured to store data enabling changed content to be rendered;
    at least one processor; and
    memory storing computer-executable instructions that, when executed by the at least one processor, cause the system to:
    during an interactive real-time presentation session including one or more of video and audio:
    receive, over a first communication channel, a first communication describing an event representing a change in content rendered on a first digital content renderer acting as a presenter;
    transmit, over the first communication channel to a second digital content renderer acting as a viewer, a second communication indicating the event;
    receive, over the second communication channel, a request from the second digital content renderer for data enabling the change in the content represented by the event, the request from the second digital content renderer being responsive to the first communication;
    receive, over the second communication channel, a second request from the first digital content renderer for the data enabling the change in the content;
    request, over the second communication channel from a database external to the first digital content renderer and to the second digital content renderer, the data enabling the change in the content;
    receive, over the second communication channel, the data enabling the change in the content; and
    transmit, over the second communication channel to the first digital content renderer and to the second digital content renderer, the data enabling the change in the content, wherein the change in the content is synchronously rendered on the first digital content renderer and the second digital content renderer;
    provide the first digital content renderer with an indication that the change in the content has been rendered by the second digital content renderer; and
    wherein, during the interactive real-time presentation session, the first digital content renderer and the second digital content renderer each act as both the presenter and the viewer providing two-way synchronization.

11. The system of claim 10 further comprising at least one of:
a communication layer configured to receive the first communication and to transmit the second communication, and
an application layer configured to receive the request and to transmit the data enabling the change in the content.

12. The system of claim 10 wherein the first digital content renderer and the second digital content renderer are WebRTC compliant browsers.

13. The system of claim 10, wherein at least one of the first communication and the second communication are application programming interface, API, messages.

14. The system of claim 10 further comprising at least one of a video camera and a microphone provided locally to at least one of the first digital content renderer and the second digital content renderer.

15. The system of claim 14, wherein the first communication channel is further configured to communicate at least one of audio and video content generated by the at least one of the video camera and the microphone, between the first digital content renderer and the second digital content renderer.

16. A non-transitory computer-readable medium storing computer-executable instructions that, when executed by a computer system comprising at least one processor and at least one memory, cause the computer system to perform a method comprising steps of:
during an interactive real-time presentation session including one or more of video and audio:
receiving, over a first communication channel, a first communication describing an event representing a change in content rendered on a first digital content renderer acting as a presenter;
transmitting, over the first communication channel to a second digital content renderer acting as a viewer, a second communication indicating the event;
receiving, over a second communication channel, a request from the second digital content renderer for data enabling the change in the content represented by the event, the request from the second digital content renderer being responsive to the first communication;
receiving, over the second communication channel, a second request from the first digital content renderer for the data enabling the change in the content;
requesting, over the second communication channel from a database external to the first digital content renderer and to the second digital content renderer, the data enabling the change in the content;
receiving, over the second communication channel, the data enabling the change in the content; and
transmitting, over the second communication channel to the first digital content renderer and to the second digital content renderer, the data enabling the change in the content, wherein the change in the content is synchronously rendered on the first digital content renderer and the second digital content renderer;
providing the first digital content renderer with an indication that the change in the content has been rendered by the second digital content renderer; and
wherein, during the interactive real-time presentation session, the first digital content renderer and the second digital content renderer each act as both the presenter and the viewer providing two-way synchronization.

* * * * *